United States Patent
Lawrence et al.

(10) Patent No.: US 11,994,220 B1
(45) Date of Patent: May 28, 2024

(54) WEAR SURFACE SLEEVE PRESS FIT ONTO A SHAFT IN A HIGH TEMPERATURE AIR VALVE APPLICATION

(71) Applicant: Caterpillar Inc., Peoria, IL (US)

(72) Inventors: Rodney Allen Lawrence, Frankfort, IN (US); Eric Ferguson, Cottage Grove, MN (US); Brandyn Stack, Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/984,813

(22) Filed: Nov. 10, 2022

(51) Int. Cl.
 *F16K 1/22* (2006.01)
 *B23P 19/02* (2006.01)

(52) U.S. Cl.
 CPC .............. *F16K 1/224* (2013.01); *B23P 19/02* (2013.01)

(58) Field of Classification Search
 CPC .................................. F16K 1/224; F16K 1/22
 See application file for complete search history.

(56) References Cited

U.S. PATENT DOCUMENTS

| | | | | |
|---|---|---|---|---|
| RE28,552 E | * | 9/1975 | Smith | C22C 1/0433 420/436 |
| 4,380,246 A | * | 4/1983 | Casale | F16K 27/0218 137/340 |
| 4,551,951 A | * | 11/1985 | Nace | B24B 23/06 451/355 |
| 2004/0031945 A1 | * | 2/2004 | Krimmer | B29C 45/0055 264/154 |
| 2004/0187844 A1 | * | 9/2004 | Torii | F16K 1/225 251/305 |
| 2006/0214128 A1 | * | 9/2006 | Horner | F16K 27/0218 251/305 |
| 2011/0100001 A1 | * | 5/2011 | Lilly | F16K 1/222 60/605.2 |
| 2013/0048895 A1 | * | 2/2013 | Hodebourg | F02D 9/04 251/313 |
| 2017/0342914 A1 | * | 11/2017 | Noumura | F16C 33/783 |
| 2019/0277408 A1 | * | 9/2019 | Matsushita | F16K 1/222 |

FOREIGN PATENT DOCUMENTS

| | | | |
|---|---|---|---|
| CN | 204355378 U | 5/2015 | |
| CN | 205908758 U | 1/2017 | |
| CN | 207715762 U | 8/2018 | |
| CN | 212407593 U | 1/2021 | |
| WO | WO-2014166593 A1 * | 10/2014 | ............ F02B 37/183 |

OTHER PUBLICATIONS

Translation of WO 2014166593 (Year: 2023).*

* cited by examiner

*Primary Examiner* — Kelsey E Cary
(74) *Attorney, Agent, or Firm* — Procopio, Cory, Hargreaves & Savitch LLP (57) ABSTRACT

Air valves, such as wastegates, utilize a shaft that rotates within a bushing system. Conventional deposition processes limit the thickness of the wear material between the shaft and bushing system. Accordingly, embodiments disclosed herein utilize one or more coating sleeves that are press-fit onto the shaft. This enables a thicker layer of wear material to be applied to the shaft, thereby improving the longevity and durability of the air valve, while also simplifying the manufacturing process. Embodiments may also utilize one or more anti-rotation features, such as a dowel or axial protrusion, and/or may utilize snap ring(s) to prevent axial sliding of the coating sleeve(s).

20 Claims, 6 Drawing Sheets

FIG. 9

WEAR SURFACE SLEEVE PRESS FIT ONTO A SHAFT IN A HIGH TEMPERATURE AIR VALVE APPLICATION

TECHNICAL FIELD

The embodiments described herein are generally directed to air valves, and, more particularly, to a wear surface sleeve that is press-fit onto a shaft of an air valve for a high-temperature application.

BACKGROUND

In air valves that are to be used for high-temperature applications (e.g., 700-800° C.), such as to channel exhaust gas, it is customary to utilize a high-strength, oxidation-resistant material for the operating shaft. Many of these applications also experience high rates of air-flow modulation. Therefore, the shaft is always moving relative to a stationary and dry bushing system.

To improve wear resistance, one solution is to deposit a single or multi-layer high-performance wear material onto the base material of the shaft to optimize the tribological wear pair with the dry bushing system. However, the processes utilized for deposition limit the thickness of the wear material. In general, the thinner the wear material, the shorter the life of the air valve.

The present disclosure is directed toward overcoming one or more of the problems discovered by the inventors, including providing a thicker wear material on the shaft of the air valve.

SUMMARY

In an embodiment, a system for an air valve comprises: a shaft comprising a middle portion, a first end portion extending from a first end of the middle portion along a longitudinal axis of the shaft, and a second end portion extending from a second end of the middle portion along the longitudinal axis, wherein the second end is opposite the first end; a first coating sleeve press-fit around the first end portion of the shaft and concentric with the longitudinal axis; and a second coating sleeve press-fit around the second end portion of the shaft and concentric with the longitudinal axis, wherein both the first coating sleeve and the second coating sleeve comprise a cobalt-based alloy.

In an embodiment, an air valve comprises: a housing defining a flow path through the air valve; a shaft comprising a middle portion, a first end portion extending from a first end of the middle portion along a longitudinal axis of the shaft, wherein the longitudinal axis of the shaft is perpendicular to the flow path, a second end portion extending from a second end of the middle portion along the longitudinal axis, wherein the second end is opposite the first end, a first coating sleeve press-fit around the first end portion of the shaft and concentric with the longitudinal axis, wherein the first coating sleeve comprises a cobalt-based alloy and is greater than or equal to 1 millimeter in thickness, a second coating sleeve press-fit around the second end portion of the shaft and concentric with the longitudinal axis, wherein the second coating sleeve comprises a cobalt-based alloy and is greater than or equal to 1 millimeter in thickness, and a butterfly affixed to the middle portion; a first bushing on a first side of the flow path and holding the first end portion of the shaft; and a second bushing on a second side of the flow path, opposite the first side of the flow path, and holding the second end portion of the shaft; wherein the shaft is configured to rotate within at least a range of degrees around the longitudinal axis.

In an embodiment, a method of manufacturing a shaft system for an air valve comprises: press-fitting a first end portion of a shaft through a first coating sleeve, wherein the shaft comprises a first end portion, a second end portion, and a middle portion between the first end portion and the second end portion, wherein the middle portion has a larger outer diameter than the first end portion and the second end portion, and wherein the first coating sleeve has a larger outer diameter than the outer diameter of the middle portion; press-fitting a second end portion of the shaft, opposite the first end portion of the shaft, through a second coating sleeve, wherein the second coating sleeve has a larger outer diameter than the outer diameter of the middle portion; and grinding and polishing the first coating sleeve and the second coating sleeve.

BRIEF DESCRIPTION OF THE DRAWINGS

The details of embodiments of the present disclosure, both as to their structure and operation, may be gleaned in part by study of the accompanying drawings, in which like reference numerals refer to like parts, and in which.

DETAILED DESCRIPTION

The detailed description set forth below, in connection with the accompanying drawings, is intended as a description of various embodiments, and is not intended to represent the only embodiments in which the disclosure may be practiced. The detailed description includes specific details for the purpose of providing a thorough understanding of the embodiments. However, it will be apparent to those skilled in the art that embodiments of the invention can be practiced without these specific details. In some instances, well-known structures and components are shown in simplified form for brevity of description. Also, it should be understood that the various components illustrated herein are not necessarily drawn to scale. In other words, the features disclosed in various embodiments may be implemented using different relative dimensions within and between components than those illustrated in the drawings.

Figure 1:
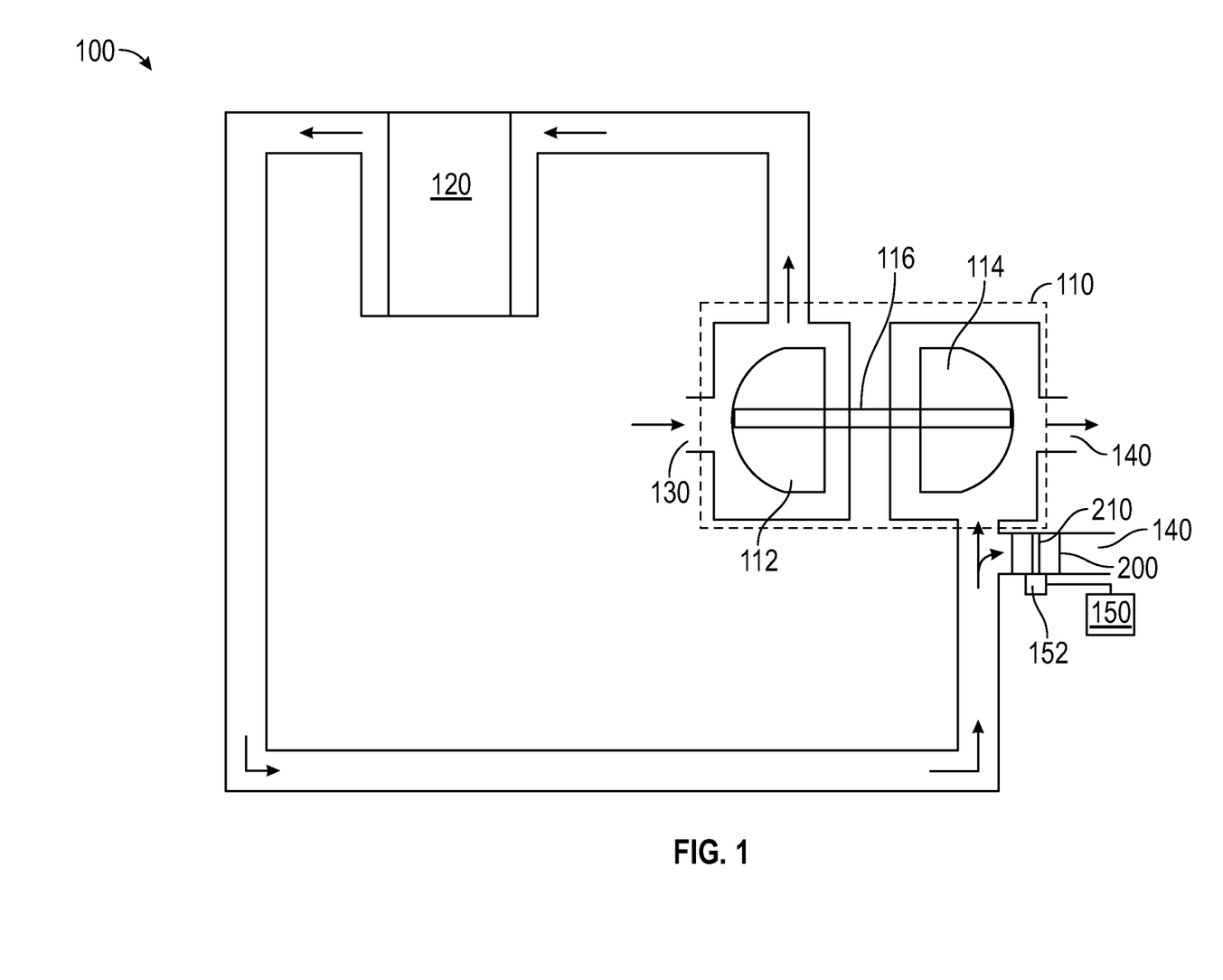
FIG. 1 illustrates a schematic diagram of an example system in which an air valve may be used, according to an embodiment.

FIG. 1 illustrates a schematic diagram of an example system 100 in which an air valve 200 may be used, according to an embodiment. System 100 may be used in a combustion engine 120 used for power generation, such as for the propulsion of vehicles or other machinery. The engine can include various power generation platforms, including for example, an internal combustion engine, whether gasoline, natural gas, dynamic gas blending, or diesel. It is understood that the present disclosure can apply to any number of piston-cylinder arrangements and a variety of engine configurations, but not limited to, V-engines, inline engines, and horizontally opposed engines, as well as overhead cam and cam-in-head block configurations. In some applications, the internal combustion engines disclosed herein are contemplated for use in gas compression. Thus, the internal combustion engines can be used in stationary applications in some examples. In other applications the disclosed internal combustion engines can be used with vehicles and machinery that include those related to various industries, including, without limitation, oil exploration, construction, agriculture, forestry, transportation, material handling, waste management, or the like. In this particular example, air valve 200 is a wastegate used with a turbocharger 110 of a combustion engine 120. However, it should be understood that air valve 200 may be used in any type of machine and in any application in which air flow is regulated, and is particularly beneficial in high-temperature applications. For example, air valve 200 may be utilized in a compressor bypass, an exhaust gas recirculation (EGR) system, an energy recovery ventilation (ERV) system, or the like.

Ambient air may flow through an inlet 130 into a compressor 112 of turbocharger 110, where it is compressed. The compressed air may travel to combustion engine 120, which may utilize the compressed air for combustion and produce exhaust. The exhaust may flow from combustion engine 120 to a turbine 114 of turbocharger 110. The exhaust may power turbine 114, which drives shaft 116, which rotates compressor 112. The exhaust may then exit system 100 via an outlet 140.

In order to regulate the speed of turbine 114, and thereby the speed of compressor 112, some of the exhaust may be diverted prior to reaching turbine 114. In particular, some of the exhaust may flow through air valve 200. The amount of exhaust that flows through air valve 200 may be regulated via rotation of a shaft 210 that extends across the flow path through air valve 200. Shaft 210 may be rotated under the control of a control system 150. In particular, control system 150 controls an actuator arm 152 to rotate shaft 210 within a range of degrees, representing a fully closed position of air valve 200 at one end of the range and a fully open position of air valve 200 at the other end of the range. Exhaust that is diverted through air valve 200 may exit system 100 via outlet 140.

Figure 2:
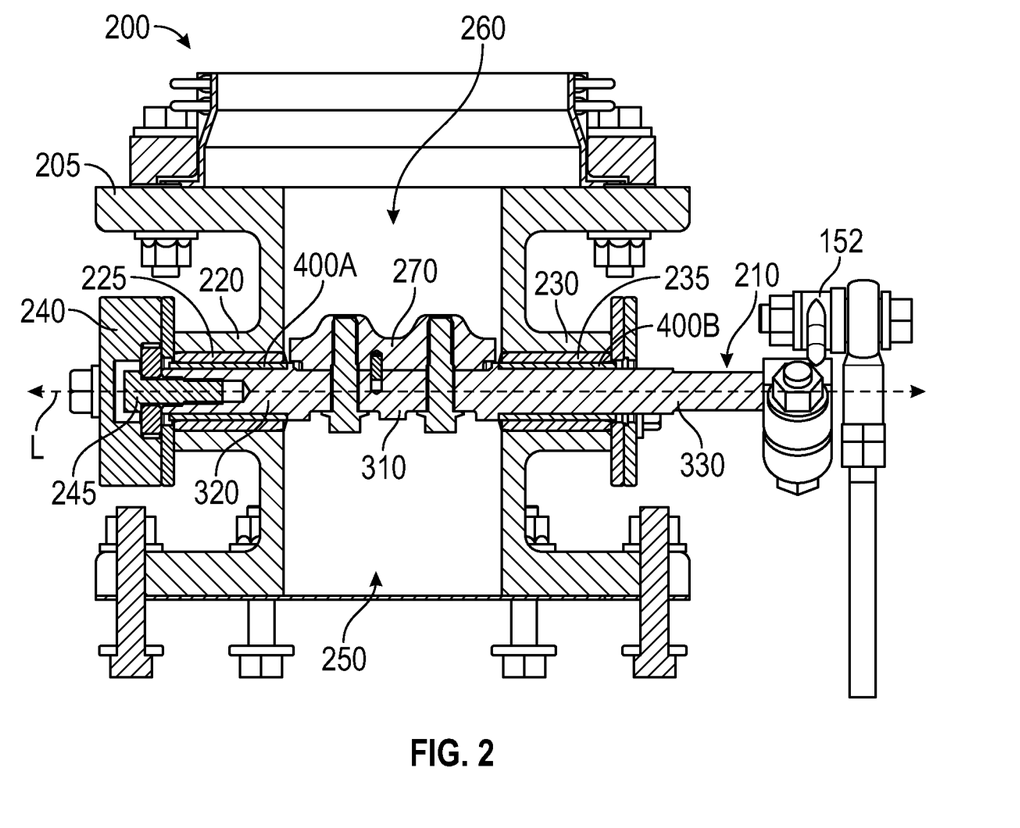
FIG. 2 illustrates a cross-sectional diagram of an air valve, according to an embodiment.

FIG. 2 illustrates a cross-sectional diagram of an air valve 200, according to an embodiment. Shaft 210 extends through a channel, comprising a first channel portion 220 and a second channel portion 230, formed through a housing 205 of air valve 200. Shaft 210 may be held within the channel by being fastened to an end cap 240 via a fastener 245. This fastening prevents shaft 210 from sliding out of the channel along the longitudinal axis L of shaft 210, while enabling shaft 210 to rotate freely within the channel around longitudinal axis L.

Shaft 210 may be made of any suitable material. For high-temperature applications, shaft 210 may be made of a nickel-chromium-based alloy. An example of a material that may be used for shaft 210 is Inconel™ Alloy 718. Inconel™ Alloy 718 is a high-strength, corrosion-resistant, nickel-chromium-iron material that can be used from −250° C. to 700° F.

Housing 205 defines a flow path through air valve 200 from a first open end 250 to an opposing second open end 260. Shaft 210 comprises a middle portion 310 that extends perpendicularly across the flow path. A first end portion 320 extends from a first end of middle portion 310 along longitudinal axis L and through first channel portion 220. Similarly, a second end portion 330 extends from a second end of middle portion 310, opposite first end portion 320, along longitudinal axis L and through second channel portion 230. Although not necessary, first end portion 320 may have the same outer diameter as second end portion 330. Both first end portion 320 and second end portion 330 have a smaller outer diameter than the outer diameter of middle portion 310. Notably, each of the various portions 310, 320, 330 may not necessarily have a constant outer diameter along longitudinal axis L. Thus, as used herein, the term "outer diameter" refers to the outer diameter at the point at which middle portion 310 meets each end portion 320 and 330. Middle portion 310, first end portion 320, and second end portion 330 may all be made from the same material as a single integral piece, may be made from the same material as separate pieces that are joined in any known manner, or may be made from different materials as separate pieces that are joined in any known manner.

Second end portion 330 may be fixed to actuator arm 152, such that any rotation of actuator arm 152 around longitudinal axis L is transferred to second end portion 330 so as to rotate second end portion 330 therewith. Accordingly, as actuator arm 152 rotates under the control of control system 150, shaft 210 also rotates.

A butterfly 270 may be fastened to middle portion 310. Butterfly 270 may comprise a thin substrate with a profile in plan view that substantially matches the profile of the flow path between first open end 250 and second open end 260. For example, butterfly 270 may be circular with an outer diameter that matches or is slightly smaller than the inner diameter of the flow path. As shaft 210 rotates, butterfly 270 will rotate with shaft 210. In a position in which butterfly 270 is perpendicular to the flow path, as illustrated in FIG. 2, butterfly 270 will maximally block the flow path, such that air valve 200 is in a fully closed position. If butterfly 270 is rotated 90-degrees from this perpendicular position, such that it is parallel to the flow path, butterfly 270 will minimally block the flow path, such that air valve 200 is in a fully open position. In this case, exhaust or other gas can flow through the flow path on either side of shaft 210 and butterfly 270. It should be understood that shaft 210 may be rotated to any position between the fully closed and fully open positions by actuator arm 152, such that the area of the flow path across shaft 210 may be finely controlled by control system 150. In this manner, control system 150 may control the volume or rate of gas flowing through air valve 200.

A first coating sleeve 400A may be press-fit around first end portion 320. Similarly a second coating sleeve 400B may be press-fit around second end portion 330. Both first coating sleeve 400A and second coating sleeve 400B, which may be collectively referred to herein as coating sleeves 400, may be concentric with longitudinal axis L. In an embodiment, each coating sleeve 400 is made from a cobalt-based alloy (e.g., approximately 60% cobalt or higher), and preferably a cobalt-molybdenum-based or cobalt-chromium-molybdenum-based alloy. An example of a material that may be used for coating sleeves 400 is Tribaloy™ T-400. Tribaloy™ T-400 is a cobalt-moybdenum-chromium-silicon-based alloy that combines excellent mechanical wear resistance with high corrosion resistance, and is particularly suitable in high-temperature environments and where lubrication is a problem. In an embodiment, the material used for coating sleeve(s) 400 has a coefficient of thermal expansion that matches or is similar to the coefficient of thermal expansion of the material used for shaft 210 (e.g., Inconel™ Alloy 718).

First end portion 320 with first coating sleeve 400A may rotate together within a first bushing 225 in first channel portion 220. Similarly, second end portion 330 with second coating sleeve 400B may rotate together within a second bushing 235 in second channel portion 230. Compared to deposition processes, coating sleeves 400 provide a relatively thick wear layer, thereby improving the longevity and durability of shaft 210 and air valve 200.

Figure 3:
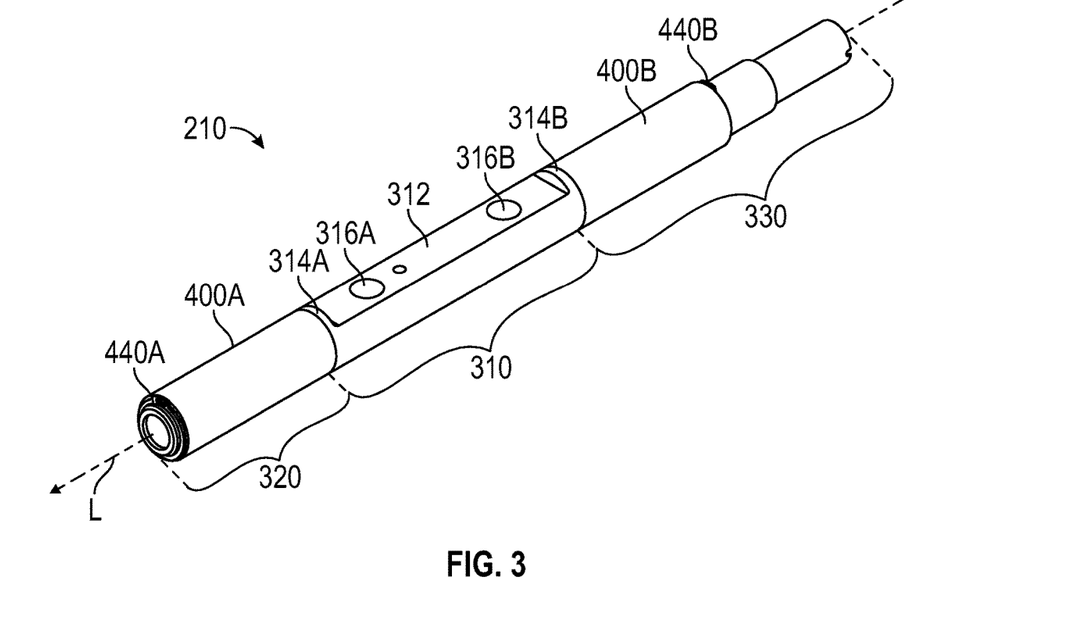
FIG. 3 illustrates a perspective view of a shaft of an air valve, according to an embodiment.

FIG. 3 illustrates a perspective view of shaft 210 of air valve 200, according to an embodiment. As illustrated, coating sleeves 400, when installed on shaft 210, have an outer diameter that matches the outer diameter of middle portion 310. Middle portion 310 may have a countersunk portion 312 that extends most of the length of middle portion 310 between two landings 314A and 314B on opposing ends of middle portion 310, along longitudinal axis L. First coating sleeve 400A may be press-fit on first end portion 320, so as to be flush with a first landing 314A, and second coating sleeve 400B may be press-fit on second end portion 330, so as to be flush with a second landing 314B. Landings 314A and 314B prevent first coating sleeve 400A and second coating sleeve 400B, respectively, from sliding axially onto middle portion 310. As used herein, the term "axial" or "axially" refers to an axis that is parallel to longitudinal axis L.

Countersunk portion 312 is configured to engage with a corresponding portion of butterfly 270. In particular, the corresponding portion of butterfly 270 may be sized to rest flush against countersunk portion 312, between landings 314A and 314B. At least two apertures 316A and 316B, which may be collectively referred to herein as apertures 316, may extend through countersunk portion 312 to the opposite side of shaft 210, perpendicular to and intersecting longitudinal axis L. Fasteners (e.g., bolts or screws) may be inserted through apertures 316A and 316B from the opposite side of shaft 210 and into corresponding and aligned apertures within the corresponding portion of butterfly 270. These fasteners may then be tightened to thereby affix butterfly 270 to middle portion 310 of shaft 210. It should be understood that this is simply one attachment example, and that butterfly 270 may be affixed to middle portion 310, or shaft 210 more generally, in any suitable manner.

In an embodiment, snap rings 440A and 440B, which may be collectively referred to herein as snap rings 440, may be snapped within corresponding snap-ring grooves on shaft 210. First coating sleeve 400A may be sized in longitudinal length to extend axially from middle portion 310 up to the snap-ring groove in first end portion 320, such that first coating sleeve 400A is flush with landing 314A on one end and snap ring 440A on the opposing end. Snap ring 440A, when seated within the snap-ring groove in first end portion 320, prevents first coating sleeve 400A from sliding axially off of shaft 210. Similarly, second coating sleeve 400B may be sized in longitudinal length to extend axially from middle portion 310 up to the snap-ring groove in second end portion 330, such that second coating sleeve 400B is flush with landing 314B on one end and snap ring 440B on the opposing end. Snap ring 440B, when seated within the snap-ring groove in second end portion 330, prevents second coating sleeve 400B from sliding axially off of shaft 210.

Figure 4:
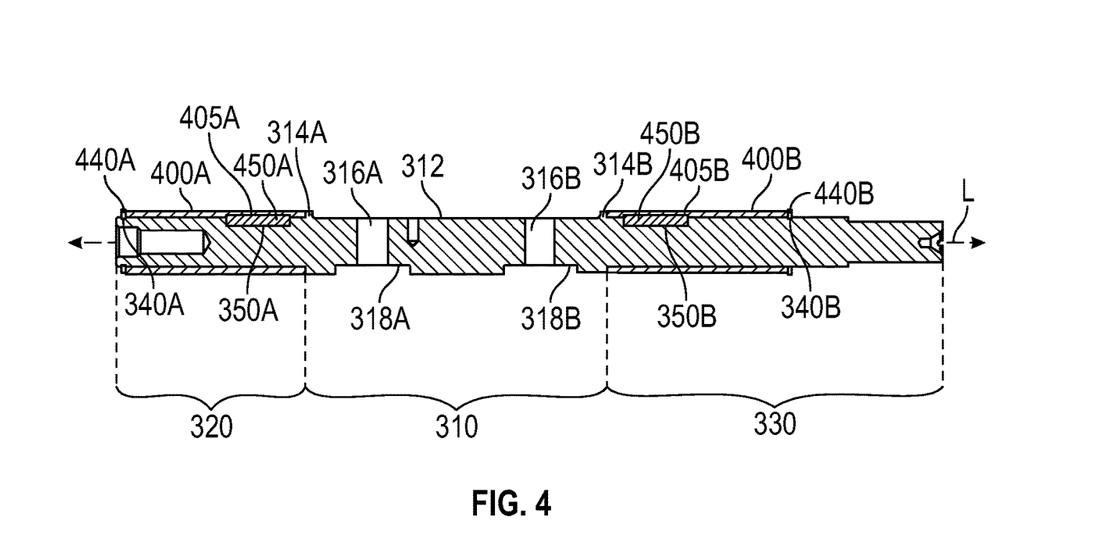
FIG. 4 illustrates a cross-sectional view of a shaft of an air valve, according to an embodiment.

FIG. 4 illustrates a cross-sectional view of shaft 210 of air valve 200, according to an embodiment. In this view, snap-ring groove 340A in first end portion 320 and snap-ring groove 340B in second end portion 330 are visible. In addition, it can be seen that apertures 316 extend through the entirety of shaft 210 from countersunk portion 312 to respective countersunk holes 318, which include countersunk hole 318A and countersunk hole 318B. In particular, aperture 316A extends between countersunk portion 312 and countersunk hole 318A, and aperture 316B extends between countersunk portion 312 and countersunk hole 318B. Countersunk holes 318 enable a fastener head (e.g., bolt head or nut) to be installed flush against the outer surface of shaft 210, when affixing butterfly 270 to countersunk portion 312.

In an embodiment, recesses 350, including recess 350A and recess 350B, may be machined (e.g., milled) radially into shaft 210. In particular, recess 350A extends radially through an outer surface of first end portion 320 in shaft 210 towards longitudinal axis L, and recess 350B extends radially through an outer surface of second end portion 330 in shaft 210 toward longitudinal axis L. Recesses 350A and 350B may have the same dimension or different dimensions, and may be positioned along the same axial axis through shaft 210 or along different axial axes through shaft 210.

Similarly, recesses 405, including recess 405A and recess 405B, may be machined (e.g., milled) radially into coating sleeves 400. In particular, recess 405A extends radially through an inner surface of first coating sleeve 400A away from longitudinal axis L, and recess 405B extends radially through an inner surface of second coating sleeve 400B away from longitudinal axis L. Recesses 405A and 405B may have the same dimension or different dimensions, and may be positioned along the same axial axis through coating sleeves 400 or along different axial axes through coating sleeves 400. Recesses 405A and 405B may be relatively shallow (e.g., less than 20% of the thickness of coating sleeves 400A and 400B, respectively).

As illustrated, a dowel 450A and a dowel 450B, which may be collectively referred to herein as dowels 450, may be inserted into recesses 350A and 350B, respectively. This insertion may occur prior to the press-fitting of coating sleeves 400 onto shaft 210. Then, first coating sleeve 400A may be press-fit onto first end portion 320, such that recess 405A aligns with recess 350A, with dowel 450A extending into both recesses 350A and 405A, to thereby prevent first coating sleeve 400A from rotating around longitudinal axis L, relative to first end portion 320. Similarly, second coating sleeve 400B may be press-fit onto second end portion 330, such that recess 405B aligns with recess 350B, with dowel 450B extending into both recesses 350B and 405B, to thereby prevent first coating sleeve 400B from rotating around longitudinal axis L, relative to second end portion 330.

Dowels 450 may have any cross-sectional shape in a plane that is perpendicular to longitudinal axis L. For example, the cross-sectional shape of each dowel 450 may be circular or otherwise elliptical, square or otherwise rectangular, triangular, hexagonal, a widow dovetail, a stepped machine key lock, or the like. Alternatively, dowel 450 could be a C-style spring (i.e., having a cross-sectional shape that is substantially in the form of the letter "C"), or a strip of sheet metal that rests in shallow recesses 350 and 405 and slightly curves around the circumference of shaft 210. Dowels 450A and 450B may be identical in size and shape or different in size and/or shape. In any case, each dowel 450 should be configured to fit within the aligned recesses 350 and 405 while the respective coating sleeve 400 is flush with the outer surface of the respective end portion of shaft 210.

In an alternative embodiment, dowel 450 may instead be formed as part of either shaft 210 or coating sleeve 400. For example, the outer surface of first end portion 320 may comprise a radially outward facing protrusion that engages with recess 405A in first coating sleeve 400A and/or the outer surface of second end portion 330 may comprise a radially outward facing protrusion that engages with recess 405B in second coating sleeve 400B. Alternatively, the inner surface of first coating sleeve 400A may comprise a radially inward facing protrusion that engages with recess 450A in first end portion 320 and/or the inner surface of second coating sleeve 400B may comprise a radially inward facing protrusion that engages with recess 450B in second end portion 330.

Figure 5:
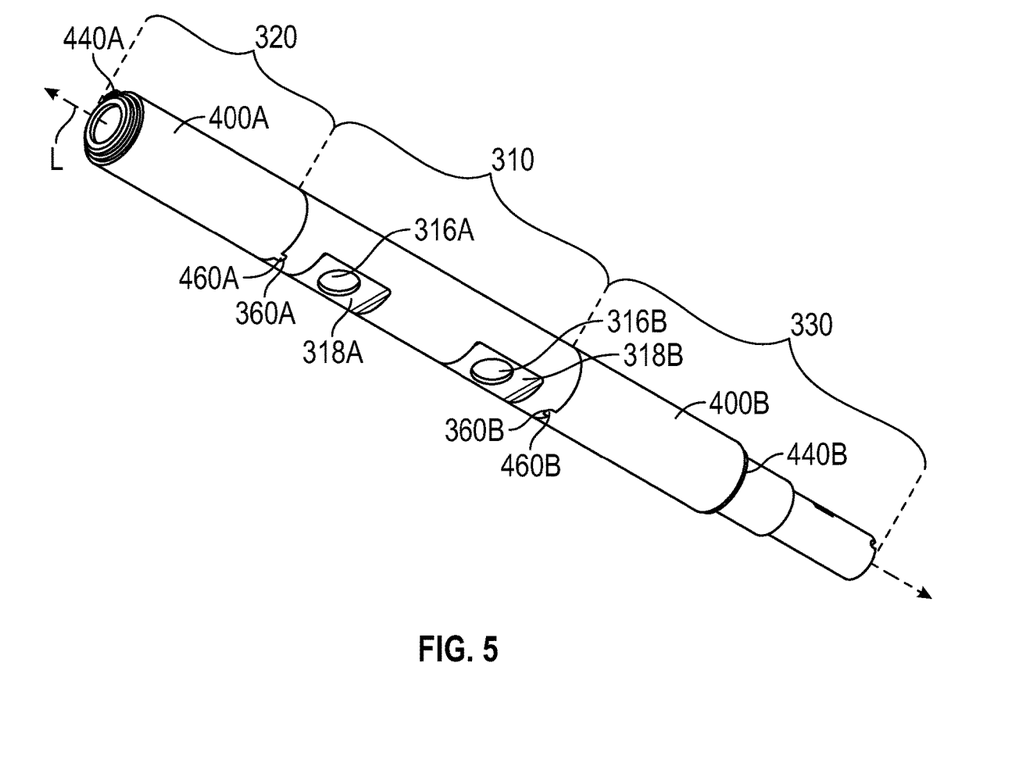
FIG. 5 illustrates a perspective view of a shaft of an air valve, according to an embodiment.
Figure 6:
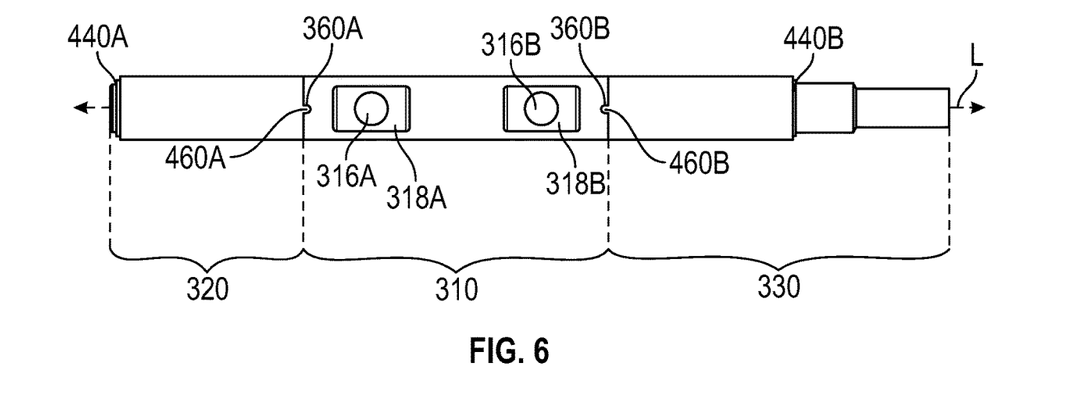
FIG. 6 illustrates a plan view of a shaft of an air valve, according to an embodiment.

FIG. 5 illustrates a perspective view of shaft 210 of air valve 200, and FIG. 6 illustrates a plan view of shaft 210 of air valve 200, according to an embodiment. As illustrated, middle portion 310 may comprise slots 360, including slot 360A and slot 360B, on opposing ends, along longitudinal axis L. In particular, slot 360A extends axially and opens towards first coating sleeve 400A, and slot 360B extend axially and opens towards second coating sleeve 400B. In addition, coating sleeves 400 comprise corresponding protrusions 460, including protrusion 460A and protrusion 460B, that are configured to engage with their respective slots 360. In particular, protrusion 460A of first coating sleeve 400A is configured to slide axially into slot 360A, to thereby prevent rotation of first coating sleeve 400A around longitudinal axis L, relative to first end portion 320. Similarly, protrusion 460B of second coating sleeve 400B is configured to slide axially into slot 360B, to thereby prevent rotation of second coating sleeve 400B around longitudinal axis L, relative to second end portion 330.

In the illustrated embodiment, slots 360 are located on a different side of shaft 210 as countersunk portion 312. While not a necessity, this enables countersunk portion 312 to be longer and landings 314 to be shorter, since landings 314 do not have to house slots 360. As illustrated, slots 360 may extend along an axial axis that bisects countersunk holes 318.

Slots 360 are illustrated as having semi-circular shapes in plan view. However, slots 360 may have other shapes, such as a square or other rectangle, a triangle with the base of the triangle facing the respective coating sleeve 400, a hexagon, or the like. Slots 360A and 360B may be identical in size and shape or different in size and/or shape.

Figure 7:
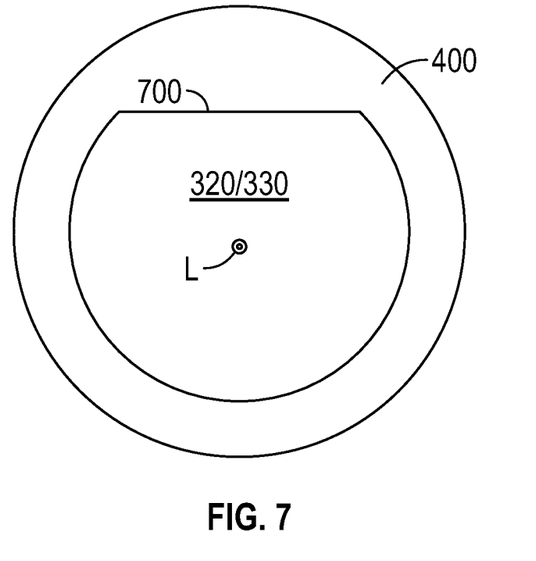
FIGS. 7 and 8 illustrate the profile of a coating sleeve, in a cross-sectional plane that is perpendicular to a longitudinal axis of a shaft of an air valve, according to two alternative embodiments.
Figure 8:
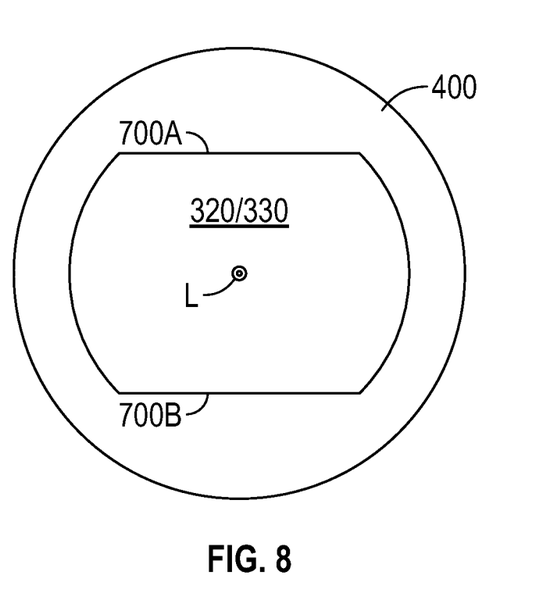

FIGS. 7 and 8 illustrate the profile of a coating sleeve 400, in a cross-sectional plane that is perpendicular to longitudinal axis L, according to two alternative embodiments. The illustrated profile may be used for first coating sleeve 400A and/or second coating sleeve 400B. As illustrated in FIG. 7, coating sleeve 400 may comprise a flat portion 700 on the inner surface of coating sleeve 400 that engages with a corresponding flat portion on the outer surface of the respective end portion 320 or 330 of shaft 210. The engagement of the corresponding flat portions prevents coating sleeve 400 from rotating around longitudinal axis L, relative to shaft 210. The flat portions may be machined (e.g., milled) into the respective component.

The embodiment illustrated in FIG. 8 is similar to the embodiment illustrated in FIG. 7, except that the inner surface of coating sleeve 400 comprises two opposing flat portions 700A and 700B on opposite sides of coating sleeve 400. In this case, each flat portion 700A and 700B engages with a corresponding flat portion on the outer surface of the respective end portion 320 or 330 of shaft 210.

Any of the features described herein may be used in any combination with any one or more of the other features described herein, including potentially all of the features described herein. In addition, any particular feature may be omitted in an embodiment. For example, an embodiment may utilize snap ring 440 seated within snap-ring groove 340, without incorporating dowel 450 and recesses 350 and 405 and/or without incorporating protrusion 460 and slot 360. Alternatively, an embodiment may utilize dowel 450 and recesses 350 and 405, without incorporating snap ring 440 seated within a snap-ring groove 340 and/or without incorporating protrusion 460 in slot 360. Alternatively, an embodiment may incorporate protrusion 460 in slot 360 without incorporating snap ring 440 seated within snap-ring groove 340 and/or without incorporating dowel 450 and recesses 350 and 405. Alternatively, an embodiment may utilize the profile of coating sleeve 400, illustrated in FIG. 7 or 8, with or without snap ring 440 seated within snap-ring groove 340, with or without dowel 450 and recesses 350 and 405, and/or with or without protrusion 460 in slot 360. It should be understood that other combinations of features are also possible. In addition, first coating sleeve 400A may utilize the same set of features as second coating sleeve 400B or a different set of features than second coating sleeve 400B.

Figure 9:
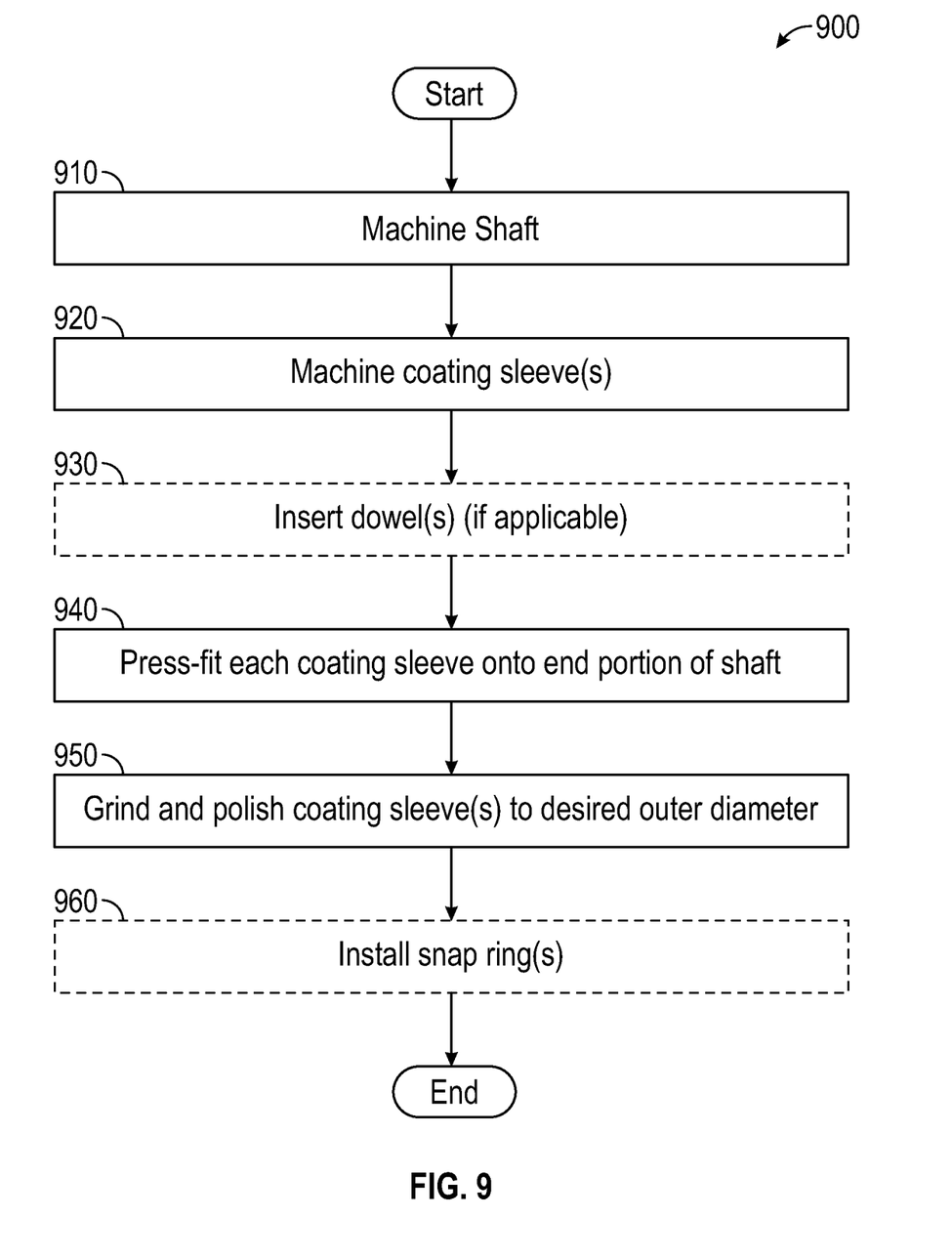
FIG. 9 illustrates a process for manufacturing a shaft of an air valve, according to an embodiment.

FIG. 9 illustrates a process 900 for manufacturing a shaft 210 of air valve 200, according to an embodiment. While process 900 is illustrated with a certain arrangement and ordering of subprocesses, process 900 may be implemented with fewer, more, or different subprocesses and a different arrangement and/or ordering of subprocesses.

In subprocess 910, shaft 210 is machined. Shaft 210 may be machined in any known manner (e.g., milled from a solid piece of material). In addition, one or more of the disclosed features may be machined (e.g., milled) into shaft 210. In particular, snap-ring groove(s) 340, recess(es) 350, slot(s) 360, countersunk portion 312, aperture(s) 316, countersunk hole(s) 318, and/or the like may be machined into the outer surface of shaft 210. For example, snap-ring groove 340 may be formed into each of first end portion 320 and second end portion 330. As another example, recess 350A may be formed radially through an outer surface of first end portion 320 toward longitudinal axis L of shaft 210, and recess 350B may be formed radially through an outer surface of second end portion 330 toward longitudinal axis L of shaft 210.

In subprocess 920, coating sleeve(s) 400 may be cast and then machined, or machined from a solid piece of material. Coating sleeve(s) 400 may be machined in any known manner (e.g., milled from a solid piece of material). For example, each coating sleeve 400 may be cast as a tube with a relatively thick wall for stability, the inner diameter may be cast and ground, and the outer diameter may be machined and ground. In addition, one or more of the disclosed features may be machined (e.g., milled) into each coating sleeve 400. For example, recess 405A may be formed through an inner surface of first coating sleeve 400A, and recess 405B may be formed through an inner surface of second coating sleeve 400B. Coating sleeve(s) 400 may be manufactured with a larger outer diameter than the outer diameter of middle portion 310.

Subprocess 930 only applies to an embodiment which utilizes dowel(s) 450, and may be omitted in all other embodiments. In subprocess 930, each dowel 450 may be inserted into a recess 350. For example, dowel 450A may be inserted into recess 350A of first end portion 320, and dowel 450B may be inserted into recess 350B of second end portion 330. In an alternative embodiment, dowel 450A may be inserted into recess 405A of first coating sleeve 400A, and dowel 450B may be inserted into recess 405B of second coating sleeve 400B.

In subprocess 940, each coating sleeve 400 is press-fit onto an end portion of shaft 210. In particular, first end portion 320 may be press-fit through first coating sleeve 400A, and second end portion 330 may be press-fit through second coating sleeve 400B. As discussed elsewhere herein, middle portion 310 has a larger outer diameter than the outer diameter of first end portion 320 and second end portion 330. In an embodiment which utilizes dowel(s) 450, recess 405 of each coating sleeve 400 is aligned with a corresponding recess 350 in the respective end portion during the press-fitting. For example, recess 405A of first coating sleeve 400A is aligned with recess 350A in first end portion 320 around dowel 450A, and recess 405B of second coating sleeve 400B is aligned with recess 350B in second end portion 330 around dowel 450B. In an embodiment which utilizes slot(s) 360, protrusion 460 of each coating sleeve 400 is aligned with a corresponding slot 360 in middle portion 310 during press-fitting. For example, protrusion 460A of first coating sleeve 400A is aligned with and slid axially into slot 360A, and protrusion 460B of second coating sleeve 400B is aligned with and slid axially into slot 360B.

In an embodiment, prior to press-fitting each coating sleeve 400 onto an end portion of shaft 210, shaft 210 may be cooled (e.g., in a double freezer) to reduce the outer diameter of shaft 210. In addition, each coating sleeve 400 may be enlarged by heating (e.g., in an oven) coating sleeve 400. Then, when coating sleeve 400 is press-fit onto a respective end portion of shaft 210, a thermal interference fit is formed. This may remove localized stresses and obviate the need for dowel(s) 450 and/or protrusions 460 to prevent relative rotation between coating sleeve(s) 400 and shaft 210.

In subprocess 950, each coating sleeve 400 is ground and polished. Coating sleeve 400 may be ground and polished to the same outer diameter as the outer diameter of middle portion 310 of shaft 210, but this is not a requirement of any embodiment. For example, in an alternative embodiment, coating sleeve 400 may be ground and polished to have a larger outer diameter than the outer diameter of middle portion 310 of shaft 210. The grinding and polishing may be performed after coating sleeve(s) 400 have been press-fit onto shaft 210 to guarantee concentricity with longitudinal axis L of shaft 210. As discussed above, each coating sleeve 400 may be manufactured with a larger outer diameter than the outer diameter of middle portion 310. Thus, after press-fitting, first coating sleeve 400A may be ground uniformly (e.g., while rotating shaft 210) to the desired outer diameter, and second coating sleeve 400B may be ground uniformly to the desired outer diameter. After the grinding, coating sleeve(s) 400 may be polished. At the end of subprocess 950, the outer diameter of shaft 210 may be uniform from at least snap-ring groove 340A to snap-ring groove 340B, with the exceptions of countersunk portion 312 and countersunk holes 318A and 318B. In an embodiment, following subprocess 950, each coating sleeve 400 may be between 1 millimeter to 3 millimeters thick (i.e., between the inner and outer diameters of coating sleeve 400), and preferably between 1.5 millimeters and 2.5 millimeters thick.

Subprocess 960 only applies to an embodiment which utilizes snap ring(s) 440, and may be omitted in all other embodiments. In subprocess 960, snap ring(s) 440 may be installed within corresponding snap-ring groove(s) 340. For example, snap ring 440A may be installed into snap-ring groove 340A in first end portion 320, and snap ring 440B may be installed into snap-ring groove 340B in second end portion 320.

In an embodiment, a physical vapor deposition (PVD) coating may be applied to the entire shaft 210 to provide additional wear resistance. For example, the PVD coating may comprise a C2-SL coating, which comprises an aluminum-titanium-nitrogen boundary layer and a chromium-nitrogen top layer. As an example, PVD coating may be 4 to 5 microns thick.

It should be understood that, once shaft 210 has been manufactured with press-fit coating sleeve(s) 400, shaft 210 may be installed in housing 205 of air valve 200. In particular, shaft 210 may be inserted through the channel comprising first channel portion 220 and second channel portion 230, with first end portion, comprising first coating sleeve 400A, within first bushing 225, and second end portion, comprising second coating sleeve 400B, within second bushing 235. Shaft 210 may be axially fixed within the channel, while being rotatable within the channel, by fastening first end portion 320 to end cap 240 via fastener 245. In addition, second end portion 330 may be fastened to actuator arm 152, and butterfly 270 may be affixed to countersunk portion 312 of middle portion 310 of shaft 210.

INDUSTRIAL APPLICABILITY

Air valves, such as wastegates, may utilize a shaft that rotates within a bushing system. A wear material may be used between the material of the shaft and bushing system to improve the longevity and durability of the shaft. However, conventional deposition processes limit the thickness of the wear material, generally to less than 250 microns.

Accordingly, embodiments disclosed herein utilize one or more coating sleeves 400 that are press-fit onto shaft 210 around the end portions that engage with the bushing system, instead of using a deposition process. This enables a thicker layer of wear material to be applied to shaft 210. For example, in an embodiment, each coating sleeve 400 may be 1 to 3 millimeters thick, and preferably, between 1.5 and 2.5 millimeters thick. This may significantly improve the longevity and durability of air valve 200 at the interface between shaft 210 and the bushing system, comprising bushings 225 and 235. It also simplifies the manufacturing process by reducing or eliminating the need for deposition.

Embodiments may also utilize one or more anti-rotation features to prevent rotation of coating sleeve(s) 400 relative to shaft 210. For example, such anti-rotation features may include a dowel 450 within aligned recesses 350 and 405 of shaft 210 and a coating sleeve 400, respectively, a protrusion 460 of a coating sleeve 400 extending axially into a slot 360 of shaft 210, a thermal interference fit between a coating sleeve 400 and shaft 210, and/or the like. In addition, a snap ring 440 may be used to prevent a coating sleeve 400 from sliding axially off of shaft 210.

It will be understood that the benefits and advantages described above may relate to one embodiment or may relate to several embodiments. Aspects described in connection with one embodiment are intended to be able to be used with the other embodiments. Any explanation in connection with one embodiment applies to similar features of the other embodiments, and elements of multiple embodiments can be combined to form other embodiments. The embodiments are not limited to those that solve any or all of the stated problems or those that have any or all of the stated benefits and advantages.

The preceding detailed description is merely exemplary in nature and is not intended to limit the invention or the application and uses of the invention. The described embodiments are not limited to usage in conjunction with a particular type of air valve. Hence, although the present embodiments are, for convenience of explanation, depicted and described as being implemented in a wastegate for the turbocharger of an engine, it will be appreciated that it can be implemented in various other types of air valves and machines comprising air valves, and in various other systems and environments. Furthermore, there is no intention to be bound by any theory presented in any preceding section. It is also understood that the illustrations may include exaggerated dimensions and graphical representation to better illustrate the referenced items shown, and are not considered limiting unless expressly stated as such.

What is claimed is:

1. A system for an air valve, the system comprising:
a shaft comprising a middle portion, a first end portion, and a second end portion, the first end portion extending from a first end of the middle portion along a longitudinal axis of the shaft, the first end portion comprising a first recess extending radially through an outer surface of the shaft towards the longitudinal axis, and second end portion extending from a second end of the middle portion along the longitudinal axis, wherein the second end is opposite the first end;
a first coating sleeve press-fit around the first end portion of the shaft and concentric with the longitudinal axis, the first coating sleeve comprises a second recess that extends radially through an inner surface of the coating sleeve away from the longitudinal axis and is aligned with the first recess;
a second coating sleeve press-fit around the second end portion of the shaft and concentric with the longitudinal axis; and
a dowel disposed within the aligned first and second recesses while the inner surface of the at least one coating sleeve is flush with the outer surface of the shaft;
wherein both the first coating sleeve and the second coating sleeve comprise a cobalt-based alloy.

2. The system of claim 1, wherein a thickness of the first coating sleeve and a thickness of the second coating sleeve are greater than or equal to 1 millimeter.

3. The system of claim 1, wherein an end of at least one of the first end portion and second end portion that is opposite the middle portion comprises a snap-ring groove, and wherein at least one of the first coating sleeve or the second coating sleeve extends axially from the middle portion up to the snap-ring groove.

4. The system of claim 3, further comprising a snap ring configured to be secured within the snap ring groove.

5. The system of claim 1, wherein the cobalt-based alloy is a cobalt-chromium-molybdenum-silicon-based alloy.

6. The system of claim 1, wherein the shaft comprises a nickel-chromium-based alloy.

7. An air valve comprising the system of claim 1.

8. The air valve of claim 7, wherein the air valve is a wastegate.

9. The air valve of claim 7, further comprising:
a housing defining a flow path through the air valve;
a butterfly affixed to the middle portion of the shaft;
a first bushing on a first side of the flow path; and
a second bushing on a second side of the flow path, opposite the first side of the flow path,
wherein the first end portion of the shaft is positioned through the first bushing and the second end portion of the shaft is positioned through the second bushing, such that the middle portion of the shaft with the affixed butterfly extends across the flow path, and
wherein the shaft is configured to rotate within at least a range of degrees around the longitudinal axis.

10. An air valve comprising:
a housing defining a flow path through the air valve;
a shaft comprising
a middle portion,
a first end portion extending from a first end of the middle portion along a longitudinal axis of the shaft, wherein the longitudinal axis of the shaft is perpendicular to the flow path and the first end portion includes a first end portion recess extending radially through an outer surface of the first end portion towards the longitudinal axis,
a second end portion extending from a second end of the middle portion along the longitudinal axis, wherein the second end is opposite the first end and the second end portion includes a second end portion recess extending radially through an outer surface of the first end portion towards the longitudinal axis,
a first coating sleeve press-fit around the first end portion of the shaft and concentric with the longitudinal axis, wherein the first coating sleeve comprises a cobalt-based alloy and is greater than or equal to 1 millimeter in thickness, the first coating sleeve further comprising a first coating sleeve recess that extends radially through an inner surface of the first coating sleeve away from the longitudinal axis and is aligned with the first end portion recess,
a second coating sleeve press-fit around the second end portion of the shaft and concentric with the longitudinal axis, wherein the second coating sleeve comprises a cobalt-based alloy and is greater than or equal to 1 millimeter in thickness, the second coating sleeve further comprising a second coating sleeve recess that extends radially through an inner surface of the second coating sleeve away from the longitudinal axis and is aligned with the second end portion recess,
a first dowel within the aligned first end portion recess and the first coating sleeve recess,
a second dowel within the aligned second end portion recess and the second coating sleeve recess, and
a butterfly affixed to the middle portion;
a first bushing on a first side of the flow path and holding the first end portion of the shaft; and
a second bushing on a second side of the flow path, opposite the first side of the flow path, and holding the second end portion of the shaft;
wherein the shaft is configured to rotate within at least a range of degrees around the longitudinal axis.

11. The air valve of claim 10,
wherein an end of the first end portion that is opposite the middle portion comprises a first snap-ring groove, and wherein the first coating sleeve extends axially from the middle portion up to the first snap-ring groove, and
wherein an end of the second end portion that is opposite the middle portion comprises a second snap-ring groove, and wherein the second coating sleeve extends axially from the middle portion up to the second snap-ring groove, and wherein the air valve further comprises a first snap ring in the first snap-ring groove, and a second snap ring in the second snap-ring groove.

12. A system for an air valve, the system comprising:
a shaft comprising a middle portion, a first end portion, and a second end portion, the first end portion extending from a first end of the middle portion along a longitudinal axis of the shaft, and a second end portion extending from a second end of the middle portion along the longitudinal axis, wherein the second end is opposite the first end;
a first coating sleeve press-fit around the first end portion of the shaft and concentric with the longitudinal axis;
a second coating sleeve press-fit around the second end portion of the shaft and concentric with the longitudinal axis; and
a slot and a protrusion disposed in the slot, the slot and the protrusion extending parallel to the longitudinal axis, one of the slot and the protrusion being disposed on the middle portion of the shaft, and another of the slot and the protrusion being disposed on the first coating sleeve;
wherein both the first coating sleeve and the second coating sleeve comprise a cobalt-based alloy.

13. The system of claim 12, wherein a thickness of the first coating sleeve and a thickness of the second coating sleeve are greater than or equal to 1 millimeter.

14. The system of claim 12, wherein an end of at least one of the first end portion and second end portion that is opposite the middle portion comprises a snap-ring groove, and wherein at least one of the first coating sleeve or the second coating sleeve extends axially from the middle portion up to the snap-ring groove.

15. The system of claim 14, further comprising a snap ring configured to be secured within the snap ring groove.

16. The system of claim 12, wherein the cobalt-based alloy is a cobalt-chromium-molybdenum-silicon-based alloy.

17. The system of claim 12, wherein the shaft comprises a nickel-chromium-based alloy.

18. An air valve comprising:
a housing defining a flow path through the air valve;
a shaft comprising
a middle portion,
a first end portion extending from a first end of the middle portion along a longitudinal axis of the shaft, wherein the longitudinal axis of the shaft is perpendicular to the flow path,
a second end portion extending from a second end of the middle portion along the longitudinal axis, wherein the second end is opposite the first end,
a first coating sleeve press-fit around the first end portion of the shaft and concentric with the longitudinal axis, wherein the first coating sleeve comprises a cobalt-based alloy and is greater than or equal to 1 millimeter in thickness,
a second coating sleeve press-fit around the second end portion of the shaft and concentric with the longitudinal axis, wherein the second coating sleeve comprises a cobalt-based alloy and is greater than or equal to 1 millimeter in thickness,
a first slot and a first protrusion disposed in the first slot, the first slot and the first protrusion extending parallel to the longitudinal axis, one of the first slot and the first protrusion being disposed on the middle portion of the shaft, and another of the first slot and the first protrusion being disposed on the first coating sleeve,
a second slot and a second protrusion disposed in the second slot, the second slot and the second protrusion extending parallel to the longitudinal axis, one of the second slot and the second protrusion being disposed on the middle portion of the shaft, and another of the second slot and the second protrusion being disposed on the second coating sleeve, and
a butterfly affixed to the middle portion;
a first bushing on a first side of the flow path and holding the first end portion of the shaft; and
a second bushing on a second side of the flow path, opposite the first side of the flow path, and holding the second end portion of the shaft;
wherein the shaft is configured to rotate within at least a range of degrees around the longitudinal axis.

19. The air valve of claim 18,
wherein an end of the first end portion that is opposite the middle portion comprises a first snap-ring groove, and wherein the first coating sleeve extends axially from the middle portion up to the first snap-ring groove, and
wherein an end of the second end portion that is opposite the middle portion comprises a second snap-ring groove, and wherein the second coating sleeve extends axially from the middle portion up to the second snap-ring groove, and
wherein the air valve further comprises a first snap ring in the first snap-ring groove, and a second snap ring in the second snap-ring groove.

20. An air valve comprising:
a housing defining a flow path through the air valve;
a shaft comprising
a middle portion,
a first end portion extending from a first end of the middle portion along a longitudinal axis of the shaft, wherein the longitudinal axis of the shaft is perpendicular to the flow path,
a second end portion extending from a second end of the middle portion along the longitudinal axis, wherein the second end is opposite the first end,
a first coating sleeve press-fit around the first end portion of the shaft and concentric with the longitudinal axis, wherein the first coating sleeve comprises a cobalt-based alloy and is greater than or equal to 1 millimeter in thickness,
a second coating sleeve press-fit around the second end portion of the shaft and concentric with the longitudinal axis, wherein the second coating sleeve comprises a cobalt-based alloy and is greater than or equal to 1 millimeter in thickness,
a first anti-rotation means for preventing relative rotation about the longitudinal axis between the shaft and the first coating sleeve,
a second anti-rotation means for preventing relative rotation about the longitudinal axis between the shaft and the second coating sleeve,
and
a butterfly affixed to the middle portion;
a first bushing on a first side of the flow path and holding the first end portion of the shaft; and
a second bushing on a second side of the flow path, opposite the first side of the flow path, and holding the second end portion of the shaft;

wherein the shaft is configured to rotate within at least a range of degrees around the longitudinal axis.

\* \* \* \* \*